UNITED STATES PATENT OFFICE.

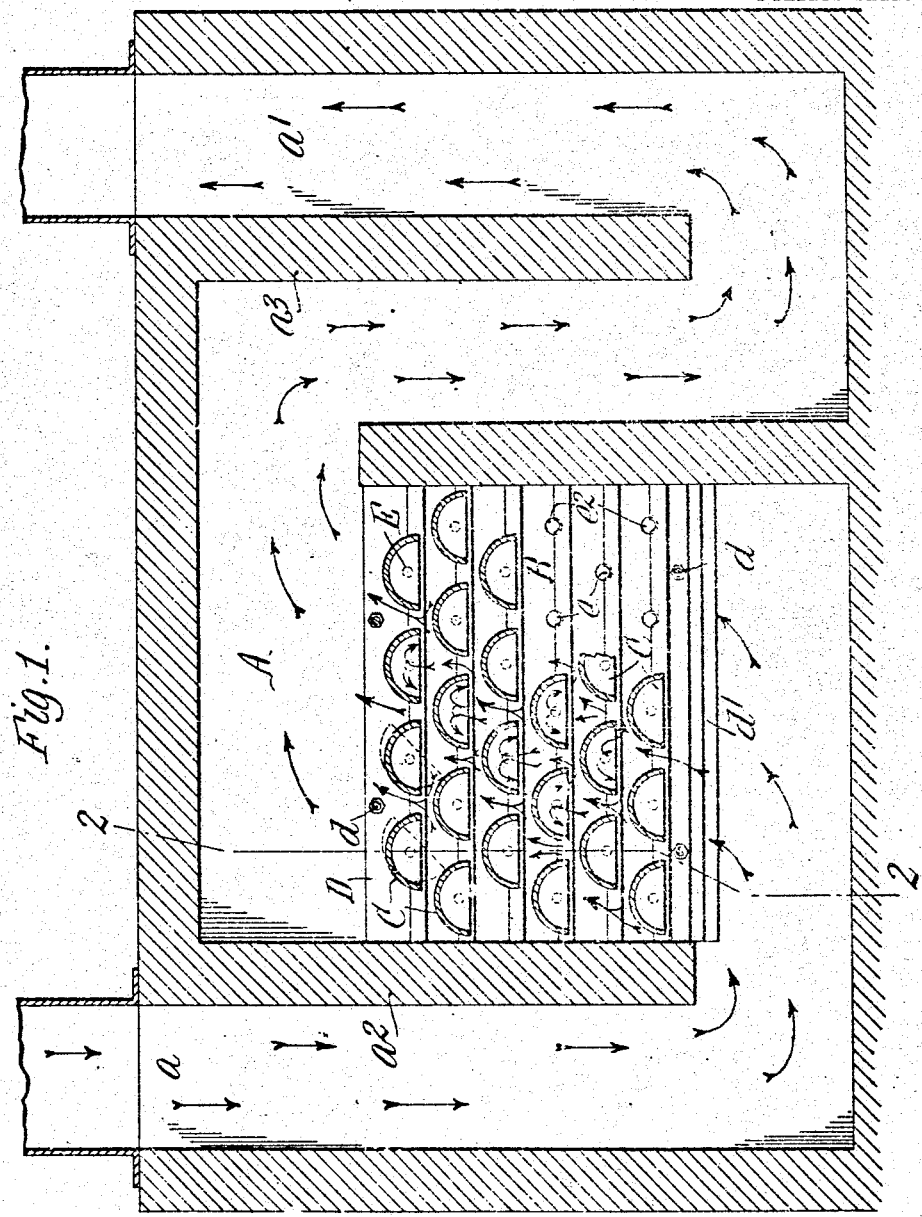

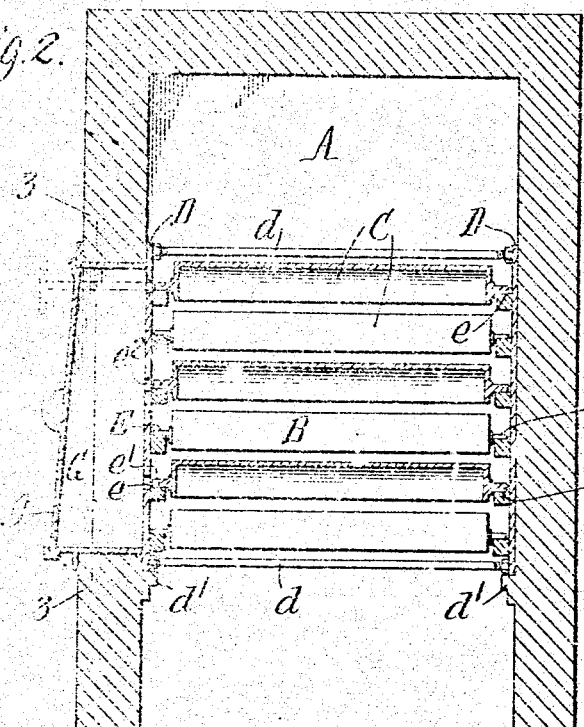
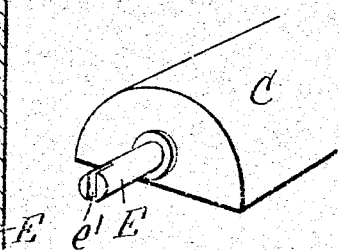
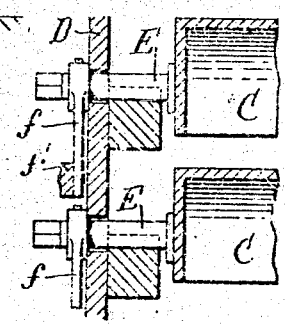
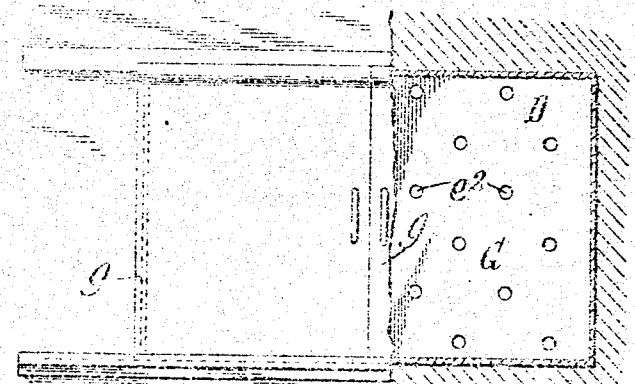
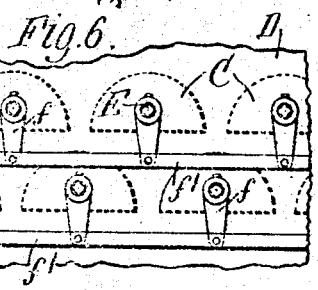
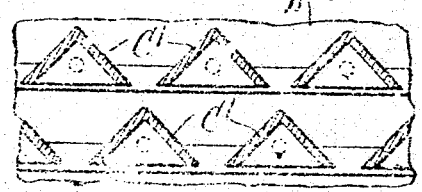

JOHN HICKEY, OF BUFFALO, NEW YORK.

DUST-ARRESTER.

972,531.

Specification of Letters Patent.

Patented Oct. 11, 1910.

Application filed May 18, 1910. Serial No. 561,960.

*To all whom it may concern:*

Be it known that I, JOHN HICKEY, a citizen of the United States, residing at Buffalo, in the county of Erie and State of New York, have invented a new and useful Improvement in Dust-Arresters, of which the following is a specification.

This invention relates to dust arresters or dust collectors of that sort which comprise a group of spaced baffles or deflectors through which dust-laden air or gas is caused to flow and which intercepts the dust and separates it from the air or gas.

The dust arrester forming the subject of this invention is primarily intended for use in apparatus for the manufacture of sulfuric acid, and is located in the flue or passage through which the gases pass from the furnace to the acid chambers for intercepting the ore dust carried by the gases and preventing it from entering the acid chambers. The dust arrester or colelctor is not, however, limited to this use and may be employed for separating dust from air and gases for any purpose.

The object of the invention is to produce an efficient and practical dust arrester or collector of this sort which is of simple and economical construction and in which the baffles or deflectors are constructed and arranged in a novel manner whereby the dust will be effectually separated from the air or gas and will be prevented from accumulating on the baffles or deflectors so as to impede the passage of the air or gas through the dust arrester.

In the accompanying drawings, consisting of two sheets: Figure 1 is a longitudinal sectional elevation of a dust arrester embodying the invention. Fig. 2 is a transverse sectional elevation thereof in line 2—2, Fig. 1. Fig. 3 is a fragmentary elevation thereof, partly in section, in line 3—3, Fig. 2. Fig. 4 is a fragmentary perspective view, on an enlarged scale, of one of the baffles removed. Fig. 5 is a fragmentary transverse section, on an enlarged scale, of a slightly modified construction. Fig. 6 is a fragmentary elevation, partly in section, of the device shown in Fig. 5. Fig. 7 is a section of a group of baffles or deflectors of slightly different shape.

Like reference characters refer to like parts in the several figures.

A represents a chamber or inclosure in which the dust arrester or collector B is located and through which the dust laden air or gas passes. This chamber may, for example, constitute a portion of the gas flue or passage connecting the furnace and the acid chambers of a sulfuric acid manufacturing apparatus. Preferably the portion $a$ of the flue leading from the furnace connects with the chamber A at the bottom thereof, while the portion $a'$ of the flue leading to the acid chambers connects with the top of the chamber A, so that the dust-laden air or gas is forced to flow in an upward direction through the dust arrester B between the cross walls or partitions $a^2$ and $a^3$ of the chamber.

The dust arrester B comprises a group of parallel spaced baffles or deflectors C which extend horizontally across the chamber A in which they are suitably mounted, preferably in a supporting frame which is open at its top and bottom for the passage of the air or gas through it. The frame shown consists of opposite upright side plates D connected by cross rods or bars $d$ and is supported with its side plates against the opposite side walls of the chamber A by ledges $d'$ formed on these walls. The baffles or deflectors are supported at opposite ends on suitable bearings or seats on the side plates D of the frame.

The baffles or deflectors C are arranged in staggered order in horizontal rows with the baffles in one horizontal row opposite the spaces between the baffles in the next row, and they are preferably of hollow semi-cylindrical shape, being arranged with their convex surfaces uppermost. The baffles or deflectors are considerably wider than the horizontal width of the intervening spaces and each baffle in one row overhangs two adjacent baffles in the next lower row, so that the air or gas ascending through each space between the baffles of one row impinges against the concave under surface of the baffle above this space and is deflected thereby in opposite directions against the convex upper surfaces of two adjacent baffles below before it can ascend through the spaces between the baffles of the second row, the air or gas ascending between the baffles of each row being thus deflected downwardly against the convex upper surfaces of these baffles by the baffles of the next row above before it ascends between these latter baffles. The dust is thus separated from the air or gas and deposited on the convex upper surfaces of the baffles, but on account of their convex or sloping upper surfaces the dust will not accumulate on the baffles and choke the air spaces sufficiently to impede the flow of the air or gas, but will fall from baffle to baffle into the bottom of the dust-collecting chamber. The baffles or deflectors can be of other analogous shape having upper surfaces which will readily shed the dust and under surfaces arranged so that the baffles of one row will deflect the air or gas downwardly against the upper surfaces of the baffles in the next lower row. For instance, the baffles can be of inverted V-shape, as shown at C' in Fig. 7.

Provision is made for rocking or oscillating the baffles or deflectors from time to time, should this be necessary, to dislodge any dust accumulating on the baffles. For this purpose the baffles have trunnions E at opposite ends adapted to rock in bearing seats e on the side plates of the supporting frame, and as shown in Figs. 2 and 4, the trunnions at one end of the baffles have slots e', or they may be otherwise fashioned, for the engagement of a key adapted to be inserted through holes $e^2$ in the adjacent side plate D for rocking the baffles. As shown in Figs. 5 and 6, rock arms f are secured to the trunnions at one end of the baffles, the rock arms of the baffles in each row being pivoted to a connecting bar f' so that all of the baffles in one row will be caused to rock together when one baffle is rocked. An opening G closed by suitable doors g is provided in one wall of the chamber A through which the operating device can be engaged with the baffles for rocking them. Any other suitable means for independently or collectively rocking the baffles can be employed.

I claim as my invention:

1. In a dust arrester, the combination with a chamber, of a group of spaced baffles arranged in rows in said chamber with the baffles in one row above the spaces between the baffles in the next lower row, said baffles having sloping upper surfaces which shed the dust and under surfaces which slope downwardly in opposite directions, whereby the under surfaces of the baffles in one row deflect the air or gas in opposite directions against the upper surfaces of the baffles in the next lower row, substantially as set forth.

2. In a dust arrester, the combination with a chamber, of a group of spaced baffles arranged in rows in said chamber with the baffles in one row above the spaces between the baffles in the next lower row, said baffles having convex upper surfaces which shed the dust and concave under surfaces which deflect the air or gas downwardly in opposite directions and being of greater width than the horizontal width of the spaces between the baffles, substantially as set forth.

3. In a dust arrester, the combination with a chamber through which the dust-laden air or gas moves upwardly, of a group of spaced hollow semi-cylindrical baffles arranged horizontally in staggered order across said chamber with their convex surfaces upward and with the concave under surface of one baffle over the space between adjacent lower baffles, substantially as set forth.

4. In a dust arrester, the combination with a chamber, of a group of spaced baffles arranged in rows in said chamber with the baffles in one row above the spaces between the baffles in the next lower row, said baffles having sloping upper surfaces which shed the dust and under surfaces arranged so that the baffles in one row deflect the air or gas in opposite directions against the baffles in the row below, and means for rocking said baffles, substantially as set forth.

Witness my hand, this 14th day of May, 1910.

JOHN HICKEY.

Witnesses:
C. W. PARKER,
C. B. HORNBECK.